United States Patent
Graunke

(10) Patent No.: US 7,184,550 B2
(45) Date of Patent: Feb. 27, 2007

(54) METHOD AND APPARATUS FOR SIMULTANEOUS DECRYPTION AND RE-ENCRYPTION OF PUBLICLY DISTRIBUTED CONTENT VIA STREAM CIPHERS

(75) Inventor: Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 10/222,093

(22) Filed: Aug. 15, 2002

(65) Prior Publication Data

US 2004/0032950 A1 Feb. 19, 2004

(51) Int. Cl.
*H04L 9/18* (2006.01)
(52) U.S. Cl. .................. 380/42; 726/26; 380/277
(58) Field of Classification Search .............. 380/42, 380/277; 726/26
See application file for complete search history.

(56) References Cited

U.S. PATENT DOCUMENTS 6,286,103 B1 * 9/2001 Maillard et al. .......... 726/26
6,687,822 B1 * 2/2004 Jakobsson .................. 713/156

OTHER PUBLICATIONS

C. E. Shannon, "Communication Theory of Secrecy Systems", 1949, pp. 665-669 and 713.*
IEEE, "The Authoritative Dictionary of IEEE Standards Terms", Dec. 2000, pp. 403.*
Schneier, Bruce, "Applied Cryptography", 1996, Second Edition, pp. 397-398.*
Net on the go, "What is a Set Top Box?", Feb. 2, 2001, pp. 1, obtained from http://web.archive.org/web/20010202030600/http://netonthego.org/.*

* cited by examiner

*Primary Examiner*—Emmanuel L. Moise
*Assistant Examiner*—Jeffrey D. Popham
(74) *Attorney, Agent, or Firm*—Steven P. Skabrat

(57) ABSTRACT

Secure communication from one encryption domain to another using a trusted module. In one embodiment, the invention includes receiving encrypted streamed content encrypted with a first key, generating a substitution key stream based on the first key and a second key, generating a transposition key stream based on the first and second keys, and simultaneously decrypting and re-encrypting the encrypted streamed content using a combination of the substitution and transposition streams to produce re-encrypted streamed content encrypted with the second key.

36 Claims, 8 Drawing Sheets

METHOD AND APPARATUS FOR SIMULTANEOUS DECRYPTION AND RE-ENCRYPTION OF PUBLICLY DISTRIBUTED CONTENT VIA STREAM CIPHERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates generally to the field of secure transmission of content such as software, music, and movies through public communications networks. More particularly, the invention relates to receiving encrypted content with a first encryption through a public communications channel and atomically re-encrypting it for private, local use with a second encryption.

2. Description of the Related Art

Many different approaches have been taken to prevent unauthorized reproduction and distribution of content such as movies and videos, music, software, and television programming. Most of these approaches have focused on one of two areas of vulnerability of the content. The first area is the distribution of content to the end customer. Cable and satellite broadcasters, for example, broadcast almost all programming with encryption. The keys to the encryption are sent to a set-top box that receives the encrypted broadcast data, decrypts it, and forwards it to playback or recording devices (e.g., televisions (TVs), video cassette recorders (VCRs)). Similarly, for software distributed over a public channel such as the Internet, the software is frequently encrypted prior to the transmission between the server and the client, then decrypted upon receipt by the client and installed into the computer in an unencrypted form. In another example, for DVD's (Digital Video Disks or Digital Versatile Disks) there is an encryption format embedded into the disk that is decrypted by the DVD player. The unencrypted signal is then conveyed to playback or recording devices.

All of these systems allow for the transmission channel or media to be reasonably secure. Typical unauthorized users receiving broadcasts of cable or satellite television programs or intercepting such communications on the Internet, are frustrated by the encryption that is maintained over the radio or wired link. However in all of these systems, once the signal has been received and decrypted by a receiving device, it is then "in the clear" and available for copying, reproduction and distribution (at least some of which may be unauthorized, depending on the rights associated with the data by the content owner).

The second area of the vulnerability is the use of the content after receipt by the end customer. Several different efforts are aimed at protecting against unauthorized reproduction and distribution of copyrighted content after it has been obtained by a user or consumer. Content Protection for Recordable Media (CPRM) was jointly developed by Toshiba, Intel Corporation, IBM and Matsushita to allow consumers to store and replay the extensive range of music content that is becoming available through electronic music distribution platforms. CPRM allows music to be recorded on a portable music player, such as an MP3 player, but prevents the unauthorized reproduction and distribution of the music. High-Bandwidth Digital Content Protection (HDCP), developed by Intel Corporation, protects digital content as it is transmitted between a set-top box or player to a display or playback or recording device. Like CPRM, HDCP allows a user to enjoy and use the encrypted content, but prevents unauthorized reproduction and distribution. Digital Transmission Content Protection (DTCP,) developed by a consortium of hardware manufacturers, allows a broadcaster to include a copy control code in content to control the number and types of copies that can be made to the content.

In each of these systems, the content is decrypted at some point in the distribution chain and at that point becomes vulnerable to unauthorized reproduction and distribution. If the device receiving the content is a flexible software-driven box such as a personal computer (PC), then the software that performs the decryption, as well as the content, may be easily accessible to users that may attempt to produce unauthorized copies. This leaves the content vulnerable, notwithstanding the various efforts that have been applied to encrypt and protect it farther upstream in the content distribution model.

BRIEF DESCRIPTION OF THE DRAWINGS

The appended claims set forth the features of the invention with particularity. The present invention is illustrated by way of example, and not by way of limitation, in the figures of the accompanying drawings in which like reference numerals refer to similar elements and in which:

DETAILED DESCRIPTION OF THE INVENTION

Embodiments of the present invention improve the security of content protection mechanisms for broadcast and publicly available content. Embodiments help to limit the decryption of publicly available or broadcasted content to a single, economical, defensible, and trusted module. Subsequent less trusted processing can be done on a localized copy of the content that permits tracing and, as a result, revocation of compromised devices. The less trusted processing allows distribution of the localized content without putting a global secret key at risk. Additionally, there may be a secure offering environment at the broadcaster or manufacturer in which content is encrypted prior to its distribution. A separate secure server can manage the distribution of secret keys to users, and thereby controlling access to the content. A receiving device, such as a set-top box, personal computer, or other consumer electronics device, may receive the keys from the secure server and transform the broadcast or publicly available content encrypted with a first key into an individually and locally accessible content encrypted with a second key, using an encryption and decryption module that simultaneously decrypts and re-encrypts the content. A set of secure sink devices using the second key may then decrypt and render this content into an analog form for perception by the consumer.

Figure 1:
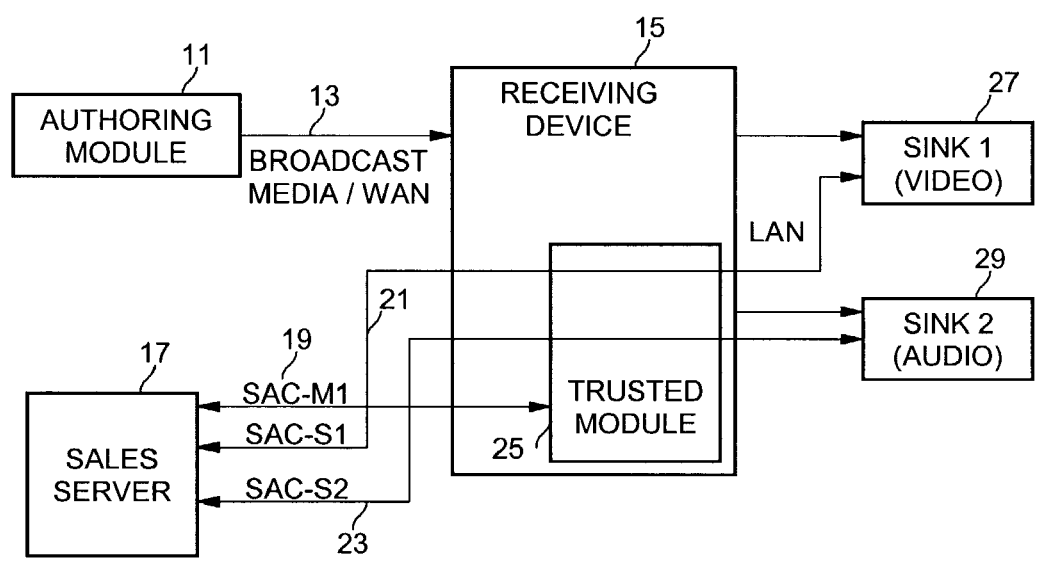
FIG. 1 is a block diagram of a content distribution system suitable for implementing embodiments of the present invention.

FIG. 1 is a block diagram of a content distribution system suitable for implementing embodiments of the present invention. An authoring module 11 may be located at any distributor or provider of content. In some environments, the distributor or content provider may be an entity such as a broadcast TV network, a cable TV network, a satellite TV network, a computer server, a web site, or a content production company, for example. The authoring module produces encrypted content for distribution using known cryptographic methods (for example, symmetric key cryptography or asymmetric key cryptography using public and private keys). Distribution may be effected through a broadcast medium 13 such as, but not limited to, a television cable system, a direct broadcast satellite system, a radio digital television system, a local area network (LAN), and a wide area network (WAN) (e.g., the Internet and/or the World Wide Web (WWW)). Content may include one or more of movies, television programs, special entertainment programs, sporting events coverage, music, computer and video games, software or images.

In an alternate embodiment, the content is not broadcast over the broadcast medium 13, but instead is recorded onto storage mediums in formats such as Compact Disk (CD), DVD, Digital Audio Tape (DAT), Digital Video Home System (D-VHS), or any other type of optical, magnetic or other data recording systems. For example, the content can be encoded onto DVDs and distributed through retail channels or the postal or commercial delivery service.

The content may be sent or transferred from authoring module 11 to a local receiving device 15 situated with a content consumer (e.g., a user or viewer). The receiving device may be any device capable of receiving the content over any broadcast medium 13 (or other distribution mechanism), such as a cable television receiver (e.g., a set-top box), a direct broadcast satellite (DBS) receiver, a DVD format player, a personal digital assistant (PDA), a cellular telephone, a personal digital video recorder (PVR), or any kind of computing device (including a micro-computer or a laptop, desktop, or handheld PC).

A sales server 17 communicates with the receiving device 15 over one or more Secure Authenticated Channels (SACs). The SACs may comprise communication channels such as telephone lines, Internet connections, connections over a coaxial cable television broadcast system, wireless connections, or broadcast channels through satellites or other radio interfaces, any of which may be made secure using known cryptographic methods.

The sales server may be a conventional computer server, adapted for communications over the Internet, a Public Switched Telephone Network (PSTN) or other network. Alternatively, any other mechanism for providing cryptographic keys over the broadcast media discussed above can be used, for example, a cable head-end or satellite downlink center. The first SAC, SAC-M1 19, connects through the receiving device 15 to a secure defensible trusted module 25. In one embodiment, this module uses an Application Specific Integrated Circuit (ASIC) that is configured specifically to perform the decryption and re-encryption methods discussed herein. In another embodiment, a removable, programmable smart card, with tamper resistant hardware designed to safeguard the keys in the event of physical attack, as well as timing and power analysis attacks, may be used. In another embodiment, the trusted module may be included as part of a larger integrated circuit (IC). In this case, the circuit may contain the computational ability to perform the public key authentication and key agreement to set up the SAC, as well as the encryption and decryption operations. The trusted module preserves the long-time secret private key (in a public key cryptosystem) used for authentication, as well as shorter-lived secrets such as the keys used for encrypting the SAC, the broadcast media decryption key and state, and the sink device encryption key and state. Accordingly, operations of the trusted module may be very difficult to analyze and users or consumers may be frustrated in trying to reverse engineer the encryption algorithms used and to discover any keys hidden in the trusted module.

The trusted module 25 communicates with sales server 17 using well known symmetric encryption keys established by key agreement algorithms. The receiving device as a whole does not need to be trusted as its function is only to facilitate communication between other devices in the system. In one embodiment, no keys are ever available to the receiving device (exclusive of the trusted module), except in an encrypted form. Trusted module 25 receives a first key (K1) over SAC-M1 19. This key may be used to decrypt the broadcast or publicly available content received from the authoring module 11.

The sales server also provides a second key (K2) over a second SAC, SAC-S1 21 to a first sink device 27 as well as to trusted module 25. A third key (K3) is provided over a third SAC, SAC-S2 23 to a second sink device 29 as well as to trusted module 25.

The trusted module performs decryption and re-encryption using the keys. This can either be done completely within the module or a cipher stream may be generated by the module that is applied to the content by the receiving device. In one embodiment, as explained below, this cipher stream may be used to perform decryption and re-encryption of received content in one atomic, secure, non-interruptible operation. This decryption and re-encryption provides for the reception of the broadcast content as encrypted by a first, globally used key, decryption of the encrypted content, and re-encryption of the content using a second, local key individually associated with a selected sink device.

The first and second sink devices may be used by the user or consumer to render the content received from the authoring module. This can include playback, recording or both. In the embodiment of FIG. 1, the first sink device comprises a video display, such as a television monitor. The second sink device comprises an audio device such as a Motion Pictures Expert Group's Audio Layer 3 (MP3) player. The video display may be a conventional television or a projector using Cathode Ray Tube (CRT), Liquid Crystal Display (LCD), light valve, gas discharge or any other type of display technology. The display may also include audio playback equipment. The audio sink device may be a system of amplifiers and speakers, a sound recording device such as an MP3 player or a variety of other different consumer electronics audio devices. The examples of sink devices provided herein are intended as examples only. Any type of sink device can be used to suit any particular application.

In one embodiment, the receiving device handles the communication of the keys from the sales server to the sink devices. This is done over a SAC so that the keys are not available in the receiving device. The encrypted messages are passed through the receiving device directly to the sink devices. The sink devices may have systems configured to receive the keys, to communicate with the receiving device to receive the messages from the sales server 17, and to configure the sink devices to decrypt any incoming encrypted content. Alternatively, in other embodiments, the sink devices may obtain the keys directly from the sales server without intervention from the receiving device.

Figure 2:
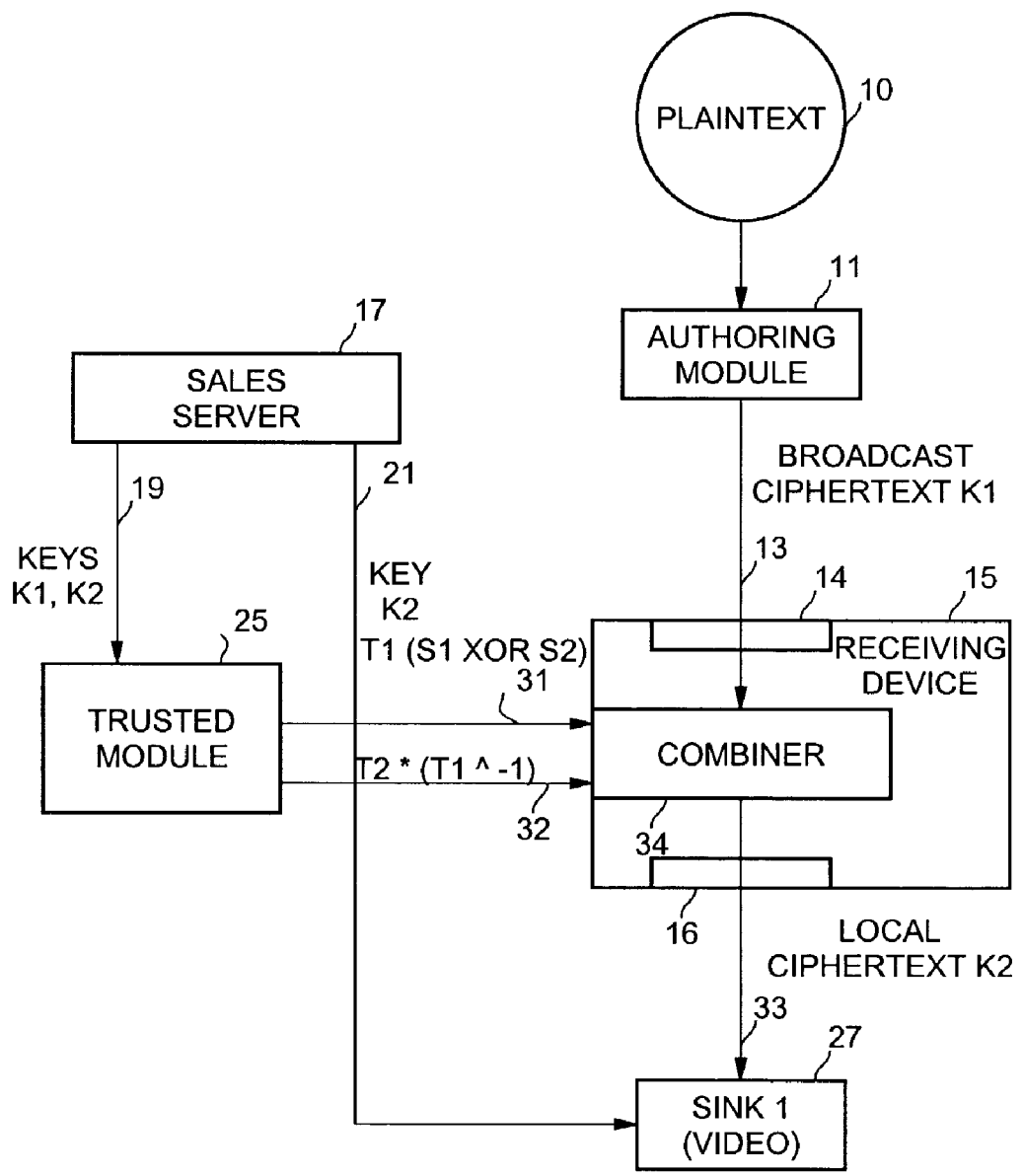
FIG. 2 is a block diagram showing a flow of encryption and decryption keys that may be implemented by the system of FIG. 1.

FIG. 2 is a block diagram showing a flow of encryption and decryption keys that may be implemented by the content distribution system of FIG. 1. The sales server 17 provides keys K1, K2 to trusted module 25 over the first SAC, SAC-M1 19. For purposes of illustration, the trusted module is shown separate from the receiving device. In various embodiments, the trusted module may be integral with the receiving device or comprise a separate device. The second SAC, SAC-S1 21, is shown as providing keys to the first sink device 27. For purposes of illustration, interaction with only one sink device is shown. However, the processing discussed herein is applicable to using more than one sink device. Only the second key, K2, is provided to the first sink 27.

Plaintext content 10 is encrypted by authoring module 11 with globally used key K1 to produce broadcast ciphertext K1 content. This operation may take place prior to distribution of keys to trusted modules (e.g., during production or manufacturing of the content). The ciphertext K1 content may be broadcast from the authoring module to receiving device 15 over broadcast medium 13 or provided from a consumer electronics content player such as a DVD player and sent over a cable to the receiving device 15. In one embodiment, the receiving device may be integral with the content player (e.g., the DVD player).

In one embodiment, ciphertext K1 content arrives at the receiving device as an encrypted stream over content interface 14. First cipher stream 31 and second cipher stream 32 emanating from trusted module 25 are combined with the ciphertext K1 content stream by combiner module 34. Combiner module 34 produces a version of the streaming content that has been decrypted using the first, globally used key, and re-encrypted with a second, locally used key in an atomic operation. In one embodiment, combiner module 34 may be integral with trusted module 25. This local ciphertext K2 may then be passed through sink interface 16 on a local line 33 to sink device 27. The re-encrypted content may be decrypted with the local key K2 (received over SAC-S1 21 from sales server 17) and may be rendered by the sink device using only the cipher stream generated by the combiner from the local key K2 (i.e., local ciphertext K2). In this scenario, since the second key, K2, may be individually designated for sink device 27, if the first key, K1, is compromised and the ciphertext K1 is captured by another receiving device, the other receiving device still cannot gain access to the plaintext content because of the combiner module's operations of simultaneous and atomic decryption and re-encryption of the content.

In an alternate embodiment, the server can use the SAC to the trusted module 25 to convey the keys to the sink devices through the receiving device 15, as shown in FIG. 1. As shown in FIG. 2, the trusted module may produce two cipher streams using the two keys that transforms the broadcasted content to a locally encrypted version. This can be done by combining the cipher streams with the content stream in an operation described in further detail below. The resulting localized content is further processed in the usual manner at the sink device, which can decrypt the content using the key that was agreed upon with the sales server 17 and produce clear analog outputs for human perception.

Because the trusted module can be provided in a secure package or format, attackers must break the trusted module to be able to distribute the secret key that is used to generate the cipher stream that can decrypt the broadcasted or publicly available content. An attack on the less expensive and less secure sink devices would only produce a key to decrypt the localized copy. This does not provide access to the broadcasted or publicly available content. Accordingly, to further reproduce and distribute the broadcasted content, this content must be redistributed by the attacker. The existing distribution infrastructure cannot be used to provide unauthorized distribution or copying.

Providing a cipher key K1 for decrypting the broadcasted content and a different cipher key K2 for encrypting and decrypting the local content together with multiple cipher streams allows for the changing of the encryption keys during the course of a broadcast. This allows one to enhance the security of an encrypted stream if the content is broadcast or distributed over a long period of time. In one embodiment, the trusted module generates both the cipher streams used to decrypt the broadcast content using K1 and the local encryption stream using K2 internally. It outputs only the product of the two cipher streams and the content stream. This stream is applied in an insecure environment to transform the broadcasted encrypted stream to a locally encrypted stream that can be understood by the sink device.

Figure 3:
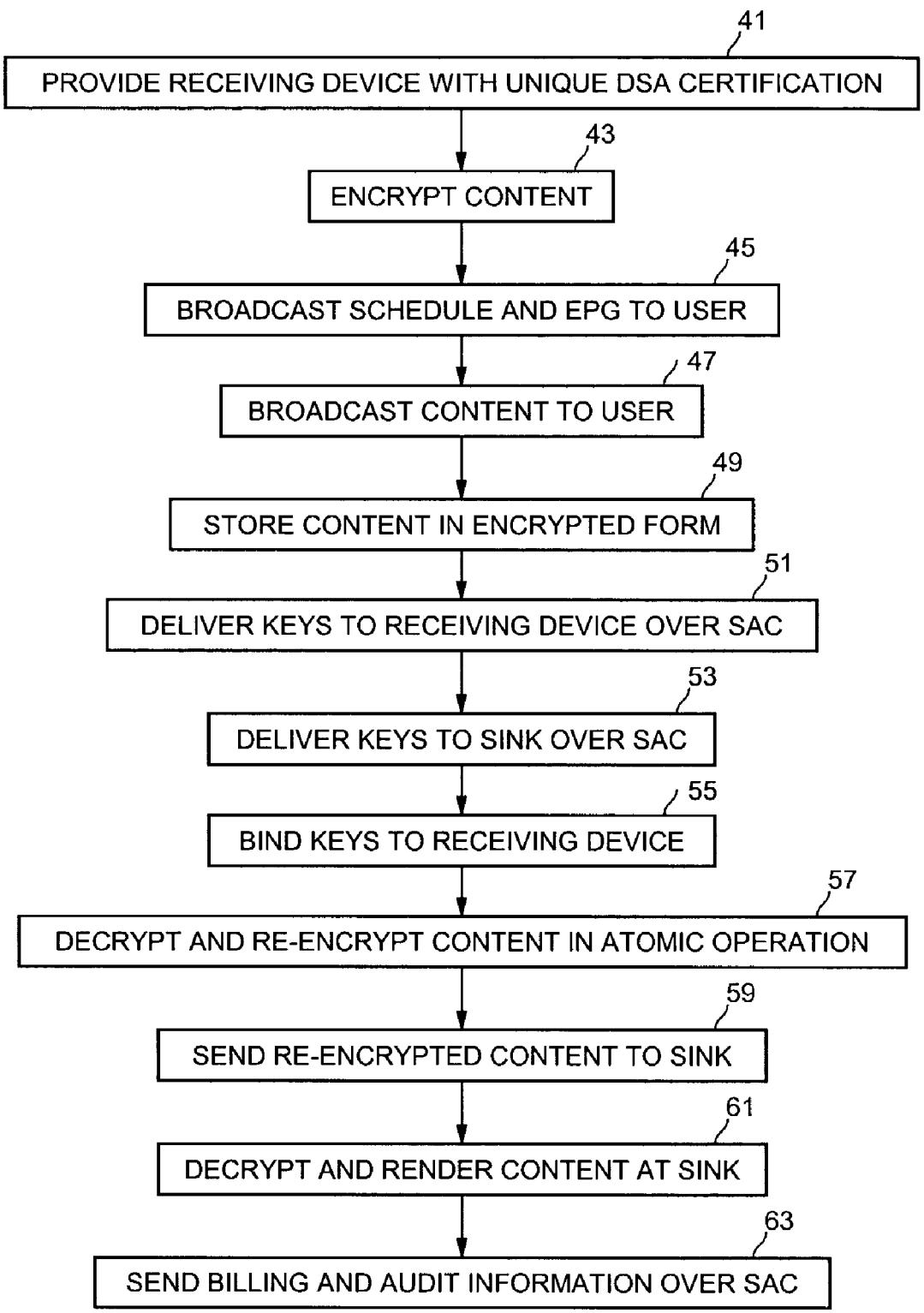
FIG. 3 is a flow diagram for implementing an embodiment of the present invention.

Referring to FIG. 3, the process for receiving encrypted content and providing it in a secure way to a sink device is shown. First, the receiving device 15 is supplied or fitted with a unique trusted module 25 which might include, for example, a Digital Signature Algorithm (DSA) signed certificate 41. The content is then encrypted 43 at an authoring, content production or distribution site. This encryption can be done using one of a number of different types of well-known ciphers. In a broadcasting context, metadata and scheduling information such as an Electronic Programming Guide (EPG) may be broadcast 45 to multiple receiving devices using satellite, cable, wireless or network communications links. The content is then broadcast 47 in an encrypted form to receiving devices of users. This encrypted content can be stored 49 on a hard disk drive, a digital video storage device or any other suitable storage medium contained in the receiving device. Alternatively, it can be buffered, then immediately decrypted, re-encrypted and conveyed to the sink devices for rendering to the user.

One or more keys are then delivered 51 to the receiving device using SACs. One or more keys are also delivered 53 to a sink device over a SAC. As mentioned above, this can be done either through a receiving device and the trusted module or it can be done directly to the sinks using a communication protocol understood by the sink devices. The keys are bound 55 to the receiving device. This is done both at the trusted module and also at the sink devices. After receiving the keys and having them bound, the encrypted content can be substantially simultaneously decrypted and re-encrypted 57 in an atomic operation by processing of the trusted module 25 and combiner 34. The re-encrypted content using the local key may then be conveyed 59 to a sink device. The sink device may then decrypt and render the content 61. In one embodiment, billing and audit information collected by the receiving device or by the sink device may be communicated 63 over SACs or another channel back to the server that manages the keys or to another server. This server can be a sales server for pay-per-view, games, or software purchases.

The ordering of the blocks described above can be changed to suit particular applications. For example, the keys can be provided before the content is received, the content can be encrypted at any time before or during broadcast and the billing and audit information can be provided before any of the other actions.

Embodiments of the present invention may enhance the security of content management systems. It allows a user entertainment system to use a small, cheap and robust component in the receiving device that preserves the security of the broadcast content. The downstream security using local keys may be made cheaper or less robust because it is working only with a localized copy of the encrypted content. This saves substantial effort and expense in the production and security mechanisms for the downstream components. In addition, ciphers can easily be changed by the sales server to allow great flexibility when working with legacy sink devices and different cipher and encryption capabilities. Finally, the use of an online server to establish key agreement in a single session can be used to enforce pay-per-view rights, rights to make copies and rights for higher grade rendering of any video or audio content. Higher grade rendering might include higher definition or resolution video, greater dynamic range, different picture formats, more audio channels or special versions, such as director's editions, special editions and editions with different ratings. Since the key may be changed at each session (or even during sessions), a previous local copy can be made obsolete so that the number of performances of the local copy can also be controlled and applied to an appropriate fee schedule.

As discussed above, the unique trusted module makes it possible to decrypt and re-encrypt a content stream in one atomic operation based on the keys. As a result, the content is never in the clear, i.e., it is never present in an accessible decrypted form on the receiving device. This enhances the total security of the system. This aspect of the present invention is a benefit no matter where the keys come from or how they are provided, determined and distributed. For example, the broadcast content key can be provided with the content and the local key can be selected by a local component, such as the receiving device or the sink device. While this approach is not as secure as using a sales server, the unique simultaneous decryption and re-encryption helps to compensate for some of the risk. Alternatively, in some encryption systems such as DTCP, the content is encrypted with a public key and the receiver such as the set-top box or disk player is equipped with a private key that can be used to decrypt the content. By simultaneously decrypting and re-encrypting using the private decryption key and a local encryption key, security is again enhanced. Accordingly, the simultaneous encryption and re-encryption using ciphers as described herein is useful separate and apart from how the keys and cipher streams are managed.

Another aspect of the invention is that of keeping all encryption functions in a separate secure module. Whether it is a separate chip, a separate section of a larger chip, or a separate component, such as a smart card, consolidating the keys and possibly the authentication information in the trusted module 25 allows this information to be secured much better or for less cost than securing the entire system. In a personal computer environment, all of the interfaces and operations can be software driven, while the keys can be protected in a way that helps to ensure integrity of the system. Since the amount of information in the trusted module is small, the cost of protecting the information can be easily controlled. In a hardware implementation, the trusted module can be further secured from attack even if the rest of the hardware is not protected. The cipher streams may be generated by the trusted module for greater security and the encryption operations can be done by the module or by faster, more general purpose processors.

In one embodiment, a stream cipher may be used by trusted module 25 to produce at least one cipher key stream input to combiner module 34. Each cipher key stream may be produced using a conventional stream cipher algorithm taking a small key and producing a one time pad such as Wider Wake (available from PictureTel Corp.), RC-4 (available from RSA Security, Inc.), and SEAL (Software Optimized Encryption Algorithm available from IBM Corp.). The key stream comprises a random stream of numbers, which when exclusively OR'ed with the ciphertext K1 stream produces a re-encrypted ciphertext K2 stream. This embodiment is described in the co-pending and commonly assigned patent application "Method and Apparatus for Simultaneous Encryption and Decryption of Publicly Distributed Media", Ser. No. 09/896,380, and "Method and Apparatus for Distributing Keys for Decrypting and Re-encrypting Publicly Distributed Media", Ser. No. 09/896,613.

To improve security however, the class of ciphers used may be extended to include substitution-transposition ciphers. When the plaintext contains known header data or regions of known text (as is often the case in distributed content), the ciphertext may reveal the raw key stream. This key stream may be used to mount a variety of attacks on stream ciphers, especially if the stream is not very short. The addition of a transposition operation as described below in embodiments of the present invention confuses the stream, so that these attacks may not be as effective.

Figure 4:
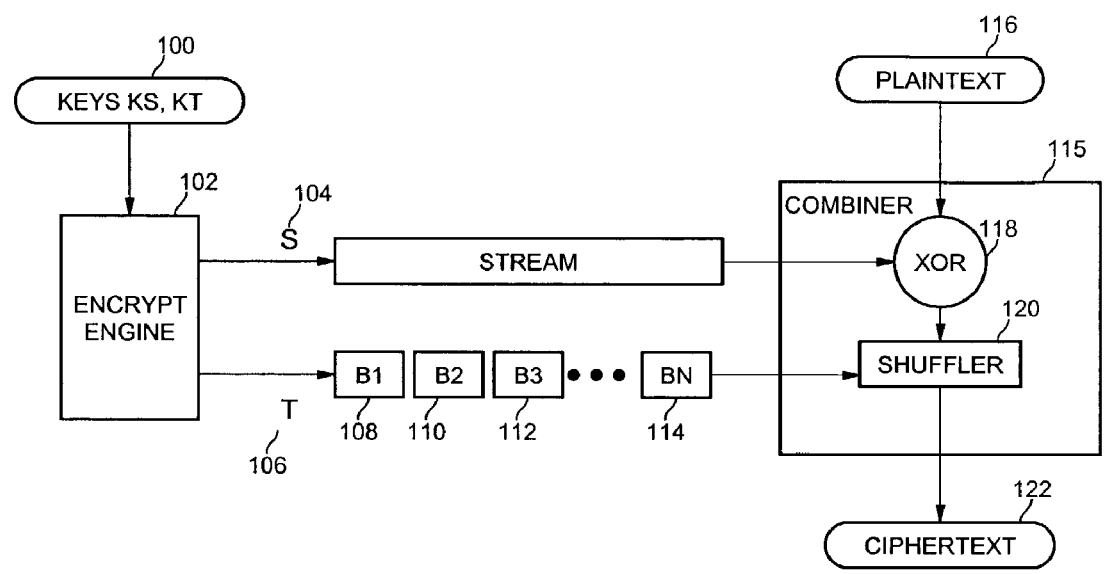
FIG. 4 is a block diagram of encrypting content according to an embodiment of the present invention.

In an embodiment of the present invention, in order to further improve security over the use of a stream cipher, a combination of a stream cipher and a transposition cipher may be used. The stream may be said to be composable, in that the decryption and re-encryption steps may be performed substantially simultaneously and atomically in one non-interruptible operation by changing the encryption key (and also without disclosing the key). FIG. 4 is a block diagram of encrypting content using a combination substitution-transposition cipher according to an embodiment of the present invention. Keys $K_S$ and $K_T$ 100 may be input to an encrypt engine 102. An original encryption may be performed by applying a stream cipher to the plaintext, and then by dividing the stream into blocks of small units of data, which are then transposed as determined by using the stream cipher to construct pseudo-random permutations for each block (that is, $E_K(P)=T_{Kt}(S_{Ks}(P))$, where E is encryption function, $K_S$ is the key for the substitution cipher, $K_T$ is the key for the transposition cipher, P is the plaintext, T is the transposition function, and S is the substitution function). In one embodiment, the stream cipher used is any well-known stream cipher, such as one of the stream cipher algorithms stated above.

As shown in FIG. 4, encrypt engine 102 uses a stream cipher to generate a substitution stream S 104 based on key $K_S$. The encrypt engine uses key $K_T$ to generate a series T 106 of block-sized random permutations B1 108, B2 110, B3 112, . . . BN 114, based on a pseudorandom number generator which uses $K_T$ as a key or seed. In one embodiment, $K_S$ and $K_T$ may be derived from a single key K. In one embodiment, each block may be an array of 8,192 numbers where B[i]=i, i from 0 to 8191. Other sizes of blocks may also be used. First, a stream of pseudorandom permutations T is divided into blocks (in one example, each block having 8,192 numbers, each number representing an index into an output buffer for a corresponding input buffer). For each block, a new pseudorandom permutation may be generated. First, a block of the transposition stream may be initialized to the identity permutation (e.g., all numbers are in order). Next, each element of the block may be exchanged with a randomly selected element after the element in the block. To determine the number of a block array element to exchange with the i'th element of the block, a random number j in the range 0 to 8191-i may be selected. These two block elements i, j may then be transposed (e.g., for the i'th element, get a new stream output j and exchange it with i+(j mod (8192-i))). This process may be repeated for i in the range 0–8191. Output values j that are so close to 65,535 to give each choice the exact same probability may be discarded. Generation of pseudorandom permutations from pseudorandom streams is well-known in the art and will not be further described herein. Although a specific way to transpose data has been described, in other embodiments, other transposition algorithms may also be used.

Each block of the transposition stream may then be processed by a shuffler module 120 to transpose elements in an input block to the position in the output block determined by the pseudorandom permutation for that block as specified by T. For each unit of transposition (such as a byte), the index of the byte in the input buffer is used to look up the proper place in the output buffer using the permutation.

The substitution stream S 104 may be input to a combiner module 115 and combined with the plaintext data 116 using an exclusive OR (XOR) operation 118 to create an intermediate stream. The transposition stream T 106 may be input to a shuffler module 120 within the combiner. The shuffler module 120 combines the transposition stream T as described above and the intermediate stream to produce ciphertext stream 122, encrypted by the key $K_T$.

Figure 5:
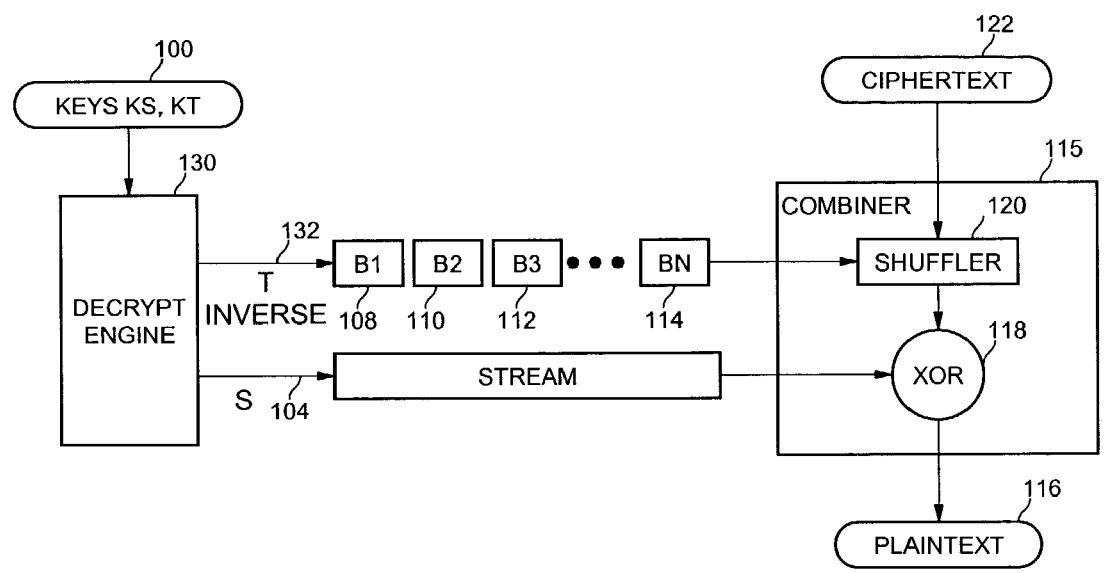
FIG. 5 is a block diagram of decrypting content according to an embodiment of the present invention.

FIG. 5 is a block diagram of decrypting content according to an embodiment of the present invention. For decryption, a decrypt engine 130 uses the same permutation in reverse to move the data in an inverse transposition, and the stream cipher is then applied to produce the plaintext (that is, $D_K(X) = S^{-1}{}_{Ks}(T^{-1}{}_{Kt}(X))$, given that $S^{-1}{}_{Ks}$ is the same as $S_{Ks}$ using exclusive-or). Thus, decrypt engine 130 generates the inverse transposition $T^{-1}$ 132 of blocks B1 108, B2 110, B3 112, . . . BN 114, and the substitution stream S 104, and inputs the two streams to combiner 115. The shuffler module 120 shuffles the ciphertext 122 to produce an intermediate stream and then combines the intermediate stream with the substitution stream S 104 using XOR 118 to produce plaintext 116.

In one embodiment shown herein, a substitution stream and then a transposition stream has been applied. One skilled in the art will recognize that the order of applying the two streams may be switched so that the transposition stream and then the substitution stream may be applied without departing from the scope of the present invention.

Table I illustrates the different embodiments depending on whether the cipher used is a substitution-transposition (also known as a substitution-permutation (SP)) or a transposition-substitution (also known as a permutation-substitution (PS)).

TABLE I

| Cipher | Action | Combiner | Combiner T | Combiner S(as function of original T and S) |
|---|---|---|---|---|
| SP | Encrypt | SP | T | S |
| SP | Encrypt | PS | T | T(S) |
| SP | Decrypt | SP | T | T(S) |
| SP | Decrypt | PS | T | S |
| SP | Transcrypt | SP | T2(T1inv) | T1(S1 xor S2) |
| SP | Transcrypt | PS | T2(T1inv) | T2(S1 xor S2), or T2(T1inv(T1(S1 xor S2))) |
| PS | Encrypt | SP | T | Tinv(S) |
| PS | Encrypt | PS | T | S |
| PS | Decrypt | SP | T | S |
| PS | Decrypt | PS | T | Tinv(S) |
| PS | Transcrypt | SP | T2(T1inv) | S1 xor T1(T2inv(S2)), or T1(T2inv(S2 xor T2(T1inv(S1))) |
| PS | Transcrypt | PS | T2(T1inv) | S2 xor T2(T1inv(S1)) |

Figure 6:
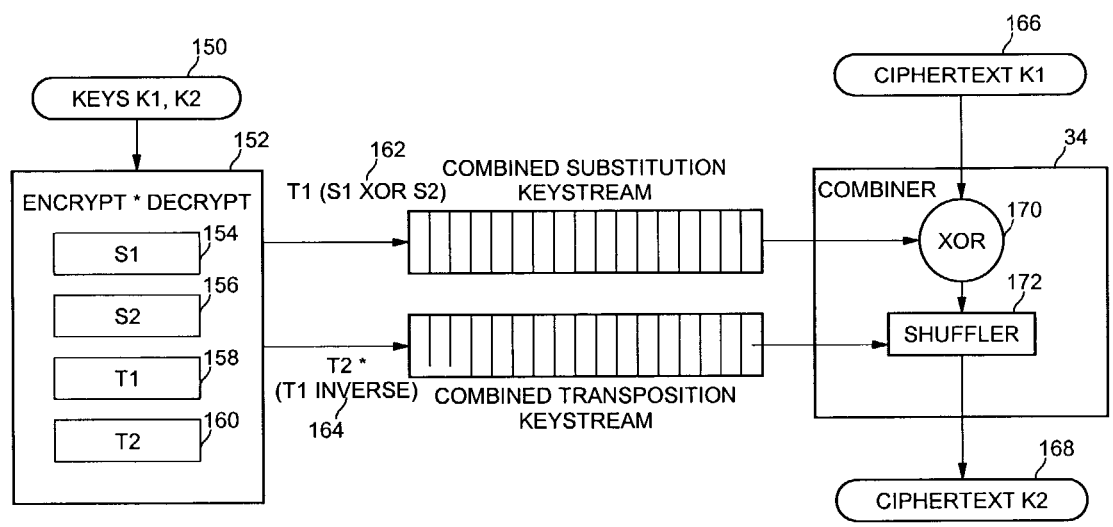
FIG. 6 is a block diagram of re-encryption of content according to an embodiment of the present invention.

FIG. 6 is a block diagram of re-encryption of content according to an embodiment of the present invention. In this embodiment, a SP cipher may be used. To transcribe from a first key K1 to a second key K2, the process is generally the same as for encryption using a SP cipher, except that the two streams are combined into a single stream, and two permutations for each block may also be combined by functional composition. As before, the composed substitution stream and the composed permutation stream give no information about either of the two components. The substitution and transposition stream parts give little information about each other, and must be solved simultaneously as well.

Let $T_1$ be the transposition stream for a first key, and $T_2$ for a second key. The transposition stream for changing from the first key to the second key may be denoted $T_2 * T^{-1}{}_1$, where "*" indicates composition and $T^{-1}{}_1$ is the inverse transposition of $T_1$. The substitution stream S may also be presented as a series of blocks. The transcribing stream may be denoted $T_1(S_1 \text{ XOR } S_2)$, where $S_1$ comprises a key stream based on the first key, and $S_2$ comprises a key stream based on the second key.

Keys K1 and K2 150 may be input to a combined "encrypt*decrypt" module 152. This module generates a first substitution key stream using K1 called $S_1$ 154, and a second substitution key stream using K2 called $S_2$ 156. The module also generates a first transposition key stream using K1 called $T_1$ 158, and a second transposition key stream using K2 called $T_2$ 160. The module combines the first and second substitution key streams $S_1$, $S_2$ using an XOR operation and further combines this stream with the first transposition key stream $T_1$ to form a combined substitution key stream 162 (e.g., $T_1(S_1 \text{ XOR } S_2)$). The module composes the second transposition key stream with the inverse of the first transposition key stream to form a combined transposition key stream 164 (e.g., $T_2 * T_1^{-1}$).

The two generated key streams may be input to combiner 34 to transcribe ciphertext 166 encrypted by key K1 into ciphertext 168 encrypted by key K2. The combined substitution key stream 162 may be input to the XOR module 170 along with the ciphertext K1 to produce an intermediate result. Shuffler module 172 accepts the combined transposition key stream 164 and the intermediate result from XOR 170 to produce ciphertext K2 168.

Figure 7:
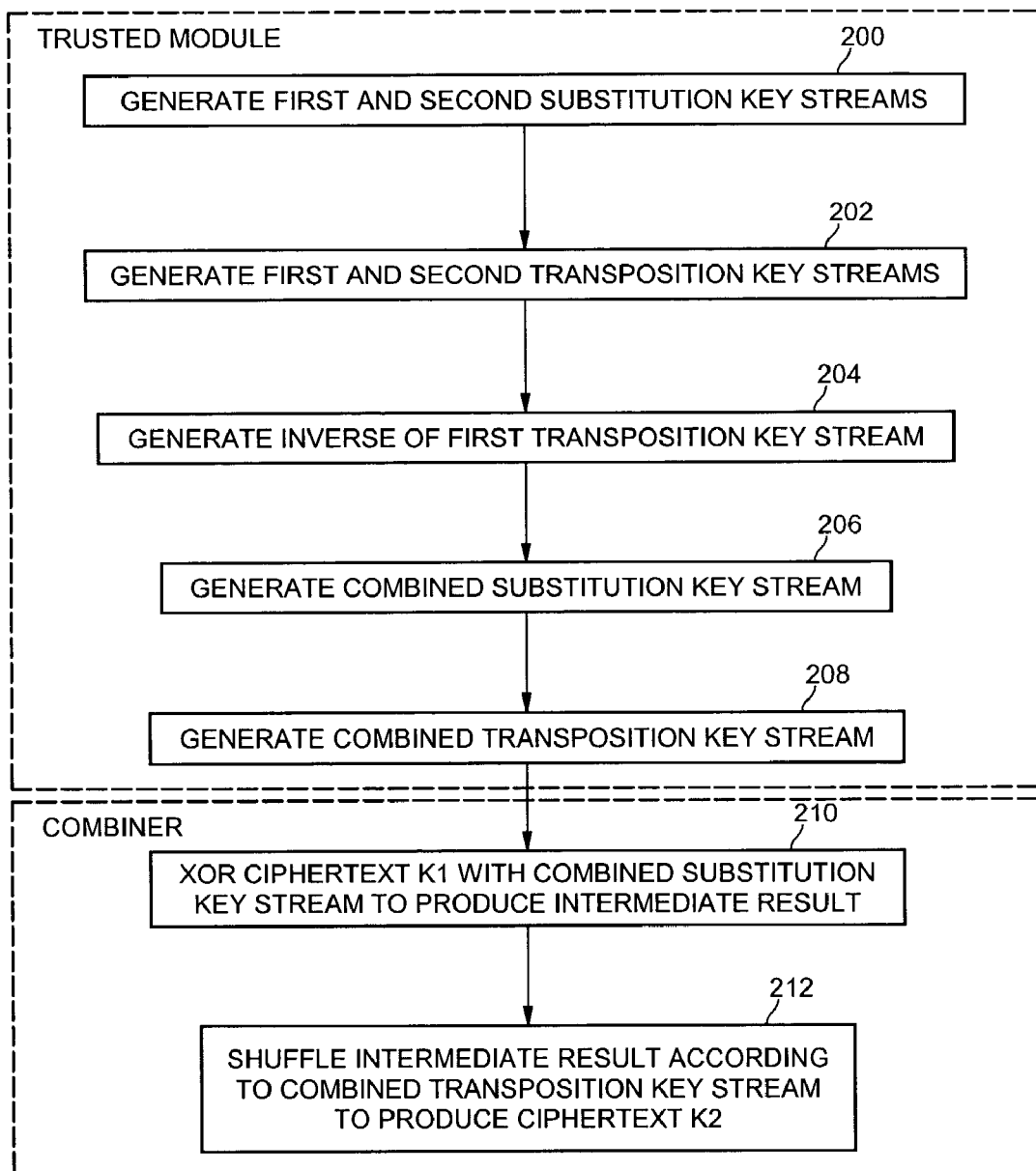
FIG. 7 is a flow diagram of re-encrypting content according to an embodiment of the present invention.

FIG. 7 is a flow diagram of re-encrypting blocks of content according to an embodiment of the present invention. In this embodiment, a SP cipher may be used. At 200, first and second substitution key streams $S_1$, $S_2$ may be generated using a stream cipher. At 202, first and second transposition key streams $T_1$, $T_2$ may be generated using a transposition cipher. Next, at 204, the inverse of the first transposition key stream $T_1^{-1}$ may be generated. Once the substitution streams and transposition streams have been generated, a combined substitution key stream may be generated at 206 by XOR'ing the first substitution key stream with the second substitution key stream and then shuffling the resulting stream according to the first transposition key stream (e.g., $T_1(S_1 \text{ XOR } S_2)$). At 208, a combined transposition key stream may be generated by composing the second transposition key stream with the inverse of the first transposition key stream (e.g., $T_2 * T_1^{-1}$). Operations 206 and 208 may be accomplished in either order. In one embodiment, operations 200 through 208 may be performed in the trusted module. The combined streams may be input to the combiner module. At 210, a block of the ciphertext encrypted with the first key, K1, may be XOR'ed with a block of the combined substitution key stream to produce an intermediate result block. At 212, the intermediate result block may be shuffled according to a block of the combined transposition key stream to produce a block of ciphertext encrypted with the second key, K2. In one embodiment, operations 210 and 212 may be performed in the combiner. In various embodiments, the order of the XOR and shuffle operations may be switched depending on which cipher (either SP or PS) is used (as shown above in Table I).

Appendix A at the end of the specification shows a relevant portion of one example implementation of a twin substitution-transposition/transposition-substitution cipher as described above. This sample implementation is written in the C programming language. Other languages and techniques may also be used to implement embodiments of the present invention without departing from the scope of the claims.

Figure 8:
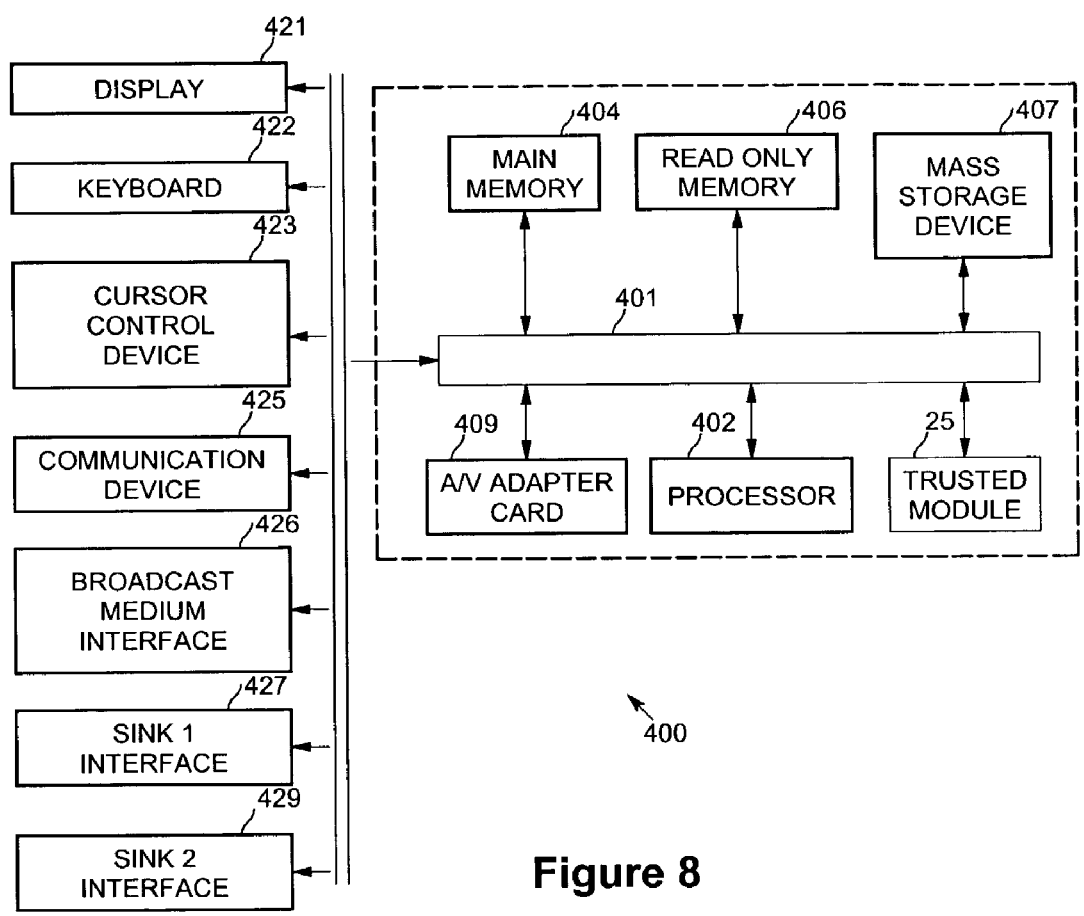
FIG. 8 is a block diagram showing one version of a receiving device suitable for use with present invention.

A processing system 400 representing an example of a system upon which the receiving device 15 of the present invention may be implemented is shown in FIG. 8. The receiving device 15 of FIG. 1 can also be configured similar to conventional cable, satellite or terrestrial airwave receivers. The processing system 400 includes a bus or other communication means 401 for communicating information, and a processing means such as a microprocessor 402 coupled with the bus 401 for processing information. The processing system 400 further includes a main memory 404, such as a random access memory (RAM) or other dynamic data storage device, coupled to the bus 401 for storing information and instructions to be executed by the processor 402. The main memory also may be used for storing temporary variables or other intermediate information during execution of instructions by the processor.

The processing system may also include a nonvolatile memory 406, such as a read only memory (ROM) or other static data storage device coupled to the bus for storing static information and instructions for the processor. A mass memory 407 such as a magnetic disk or optical disc and its corresponding drive may also be coupled to the bus of the processing system for storing information and instructions.

The processing system includes trusted module 25 coupled to the bus that receives the keys and performs the decryption and encryption discussed above. The trusted module can be provided on the motherboard, on a separate card as shown, on a special adapter card with other video or audio functions or as an external unit. It can also be provided as a software module if the software content value is sufficiently low or the hardware environment is sufficiently robust, as in some high-end smart cards.

An audio/video adapter card is coupled to the bus as is well known in the art to receive broadcast or stored data on the bus and provide audio or video to external devices. It includes dedicated accelerators and coprocessors for A/V functions. For systems that do not support analog audio or video, the A/V adapter can be provided in software only.

The processing system can also be coupled via the bus to a display device or monitor 421, such as a cathode ray tube (CRT) or Liquid Crystal Display (LCD), for displaying information to a user. For example, graphical and textual indications of installation status, operations status and other information may be presented to the user on the display device. The display device can function as the video sink 27 or a separate display can be used. Typically, an alphanumeric input device 422, such as a keyboard with alphanumeric, function and other keys, may be coupled to the bus for communicating information and command selections to the processor. A cursor control input device 423, such as a mouse, a trackball, a wireless remote control or cursor direction keys can be coupled to the bus for communicating direction information and command selections to the processor and to control cursor movement on the display 421. In some embodiments, the keyboard and cursor control can be combined into a single remote control or wired input device.

A communication device 425 is also coupled to the bus 401. The communication device 425 may include a modem, a network interface card, or other well known interface devices, such as those used for coupling to Ethernet, token ring, or other types of physical attachment for purposes of providing a communication link to support a local or wide area network (LAN or WAN), for example. In this manner, the processing system may also be coupled to a number of clients or servers via a conventional network infrastructure, including an intranet or the Internet, for example. The SACs can be provided through the communication device.

A broadcast medium interface 426 is coupled to the bus and receives broadcasts from any of the sources of content discussed above. This interface may be a coaxial cable demodulator, direct broadcast satellite TV receiver, FM radio receiver, streaming Internet interface or any of a variety of other devices. The interface conveys the received content to the bus for decryption and rendering. Alternatively, the interface can be a digital disk or tape input interface that can be coupled to a digital tape or disk player.

Interfaces 427, 429 to the first and second sinks 27, 29 are also coupled to the bus to convey the locally encrypted content for recording or rendering to the consumer. These interfaces can be in a variety of forms to suit a variety of different signals depending on the requirements of the sinks. As mentioned above, output signals can include National Television Standards Committee (NTSC) with Macrovision, Universal Serial Bus (USB) with CPRM, or FireWire with HDCP among others.

It is to be appreciated that a lesser or more equipped processing system than the example described above may be preferred for certain implementations. Therefore, the configuration of the exemplary processing system 400 will vary from implementation to implementation depending upon numerous factors, such as price constraints, performance requirements, technological improvements, or other circumstances.

It should be noted that, while the steps described herein may be performed under the control of a programmed processor, such as the processor 402, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-accessible medium having stored instructions thereon, which may be used to program a computer (or other machine) to perform a process according to the present invention. The machine-accessible medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

While embodiments of the present invention are described with reference to distributing entertainment programming and software to consumers, the method and apparatus described herein are equally applicable to other multi-tier distribution of valuable content. In addition, while the invention has been described in terms of an internal trusted module 25, any other device that can be readily manufactured and that offers adequate security can be used. The module can be in hardware, firmware or software and can be integrated into a larger component such as a set-top box or provided as a stand-alone unit with appropriate interfaces.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

APPENDIX A

© 2002 Intel Corporation

```
transSP.h
#ifndef TRANSSP_H
#define TRANSSP_H
#include <memory.h>
typedef struct {
        long length;
        unsigned char *value;
} Data;
#ifdef __cplusplus
class StreamCipher {
public:
        StreamCipher() {};
        virtual void setup(Data key, Data iv) = 0;
        virtual void generate(Data buffer) = 0;
        ~StreamCipher() {};
};
class SPCipher {
private:
        int blocksize;
        StreamCipher *s, *prng;
        unsigned char *sbuffer, *tsbuffer;
        unsigned int *tbuffer, *tinvbuffer;
public:
        SPCipher(StreamCipher *ss, StreamCipher *ps, Data key, Data iv, int bs);
        encrypt(Data in, Data out);
        decrypt(Data in, Data out);
        int getBlockSize() { return blocksize; };
        ~SPCipher();
};
class SPKeyChanger {
private:
        int blocksize;
        StreamCipher *olds, *oldprng, *news, *newprng;
        unsigned char *oldsbuffer, *newsbuffer, *sbuffer;
        unsigned int *oldtbuffer, *newtbuffer, *tinvbuffer, *tbuffer;
public:
        SPKeyChanger(StreamCipher *oldss, StreamCipher *oldps, Data oldkey, Data oldiv,
                StreamCipher *newss, StreamCipher *newps, Data newkey, Data newiv, int bs);
        change(Data in, Data out);
        int getBlockSize() { return blocksize; };
        ~SPKeyChanger();
};
// by switching the order of transposition and substitution, we have a "twin" cipher
class PSCipher {
private:
        int blocksize;
        StreamCipher *s, *prng;
        unsigned char *sbuffer, *tsbuffer;
        unsigned int *tbuffer, *tinvbuffer;
public:
```

```
            PSCipher(StreamCipher *ss, StreamCipher *ps, Data key, Data iv, int bs);
            encrypt(Data in, Data out);
            decrypt(Data in, Data out);
            int getBlockSize() { return blocksize; };
            ~PSCipher();
};
class PSKeyChanger {
private:
            int blocksize;
            StreamCipher *olds, *oldprng, *news, *newprng;
            unsigned char *oldsbuffer, *newsbuffer, *sbuffer;
            unsigned int *oldtbuffer, *newtbuffer, *tinvbuffer, *tbuffer;
public:
            PSKeyChanger(StreamCipher *oldss, StreamCipher *oldps, Data oldkey, Data oldiv,
                    StreamCipher *newss, StreamCipher *newps, Data newkey, Data newiv, int bs);
            change(Data in, Data out);
            int getBlockSize() { return blocksize; };
            ~PSKeyChanger();
};
#endif
#endif
---------------------
transSP.C
#define DEBUGTRACE
#include <stdio.h>
#include "transSP.h"
// once we have the substitution stream "sub" and permutation "t"
// we can encrypt/decrypt/transcrypt the data without knowing any key
// material or secret state
static void SPcombine(unsigned char *sub, unsigned int *t,
                    unsigned char *in, unsigned char *out, int blocksize)
{
            for (int i = 0; i < blocksize; i++) {
                    // first apply the substitution and then the transposition
                    out[t[i]] = in[i] ^ sub[i];
            }
}
// alternatively, we can do the transposition first and then the substitution
static void PScombine(unsigned char *sub, unsigned int *t,
                    unsigned char *in, unsigned char *out, int blocksize)
{
            // first apply the transposition
            for (int i = 0; i < blocksize; i++) {
                    out[t[i]] = in[i];
            }
            // then apply the substitution
            for (i = 0; i < blocksize; i++) {
                    out[i] ^= sub[i];
            }
}
// generate a pseudo-random permutation from a pseudo-random character //stream
// any shuffling technique is ok, as long as it is "fair"
static void genPermutation(StreamCipher *prng, int blocksize, unsigned int *out)
{
            unsigned char rbuffer[2];
            Data rdata = { 2, rbuffer};           // get 16-bit numbers (2 bytes)
```

```
int i;
unsigned int r, m, j, t;
// blocksize is the size of the "deck of cards"
// start with the identity permutation (unshuffled sequence of numbers)
for (i = 0; i < blocksize; i++)
        out[i] = i;
// exchange each element with a randomly selected element after it
for (i = 0; i < blocksize; i++) {
        // there are blocksize - i cards after the i-th card  (numbering from zero)
        m = blocksize - i;
        // get a random number uniformly distributed between 0 and m-1
        do {
                prng->generate(rdata);
                r = rbuffer[0] + 256 * rbuffer[1];   // convert random characters to random
//number
                // make sure each number has a uniform chance by
                //throwing out numbers near the maximum
        } while (r >= (1 << 16) - ((1 << 16) % m));  // if at uneven tail, pick again
        // the other card, j, is r mod m cards after the i-th card
        j = i + r % m;
        // exchange the i-th and j-th cards
        t = out[i];
        out[i] = out[j];
        out[j] = t;
}
}
// set up the SP cipher with a certain key and IV (publicly known key value)
// using two stream cipher implementations.
// bs is the blocksize (8192 in one embodiment)
// This implementation uses the byte as a transposition unit.
SPCipher::SPCipher(StreamCipher *ss, StreamCipher *ps, Data key, Data iv, int bs)
{
        blocksize = bs;
        s = ss;
        prng = ps;
        // initialize the stream cipher for substitution
        s->setup(key, iv);
        // initialize the stream cipher we use as a pseudo-random number generator
        prng->setup(key, iv);
        sbuffer = new unsigned char [bs];
        tsbuffer = new unsigned char [bs];
        tbuffer = new unsigned int [bs];
        tinvbuffer = new unsigned int [bs];
}
// encrypt one or more blocks of "in" data into output buffer "out"
// (The input and output buffers may NOT overlap).
SPCipher::encrypt(Data in, Data out)
{
        unsigned char *inptr, *outptr;
        int i, j;
        Data sdata = { blocksize, sbuffer};
        if (in.length != out.length)
                throw;
        inptr = in.value;
        outptr = out.value;
        // do this for in.length (same as out.length) blocks
```

```
        for (i = 0; i < in.length; i++, inptr += blocksize, outptr += blocksize) {
                // generate a block of substitution data using the first stream cipher
                // in the usual manner
                s->generate(sdata);
                // generate a pseudo-random permutation using the second stream cipher as a
                // pseudo-random number generator
                genPermutation(prng, blocksize, tbuffer);
                // apply the substitution data and permutation to a block of data
                SPcombine(sbuffer, tbuffer, inptr, outptr, blocksize);
                // alternatively, we could use PScombine if we use S' = T(S)
                for (j = 0; j < blocksize; j++)
                        tsbuffer[tbuffer[j]] = sbuffer[j];
                PScombine(tsbuffer, tbuffer, inptr, sbuffer, blocksize);
                if (memcmp(sbuffer, outptr, blocksize)) {
                        printf("FAIL: SPcombine and PScombine encrypt different results\n");
#ifdef DEBUGTRACE
                        printf("SPciphertext: \t");
                        for (j = 0; j < blocksize; j++)
                                printf("%2.2x ", outptr[j]);
                        printf("\n");
                        printf("PSciphertext: \t");
                        for (j = 0; j < blocksize; j++)
                                printf("%2.2x ", sbuffer[j]);
                        printf("\n");
#endif
                } else {
                        printf("PASS: SPcombine and PScombine encrypt same results\n");
                }
        }
}
// decrypt one or more blocks of "in" data into output buffer "out"
// (The input and output buffers may NOT overlap).
SPCipher::decrypt(Data in, Data out)
{
        unsigned char *inptr, *outptr;
        int i, j;
        Data sdata = { blocksize, sbuffer};
        if (in.length != out.length)
                throw;
        inptr = in.value;
        outptr = out.value;
        // do this for in.length (same as out.length) blocks
        for (i = 0; i < in.length; i++, inptr += blocksize, outptr += blocksize) {
                // generate a block of substitution data using the first stream cipher
                // in the usual manner--we'll transpose it later
                s->generate(sdata);
                // generate a pseudo-random permutation using the second stream cipher as a
                // pseudo-random number generator
                genPermutation(prng, blocksize, tbuffer);
                for (j = 0; j < blocksize; j++) {
                        // compute the inverse permutation for decryption
                        tinvbuffer[tbuffer[j]] = j;
                }
                // use the PScombine to decrypt (transpose, then substitute)
                PScombine(sbuffer, tinvbuffer, inptr, outptr, blocksize);
                // alternatively, substitute and then transpose using Tinverse and S' = T(S)
```

```
                    for (j = 0; j < blocksize; j++) {
                    // send the substitution data through the original permutation for alternative
                            tsbuffer[tbuffer[j]] = sbuffer[j];
                    }
                    SPcombine(tsbuffer, tinvbuffer, inptr, sbuffer, blocksize);
                    if (memcmp(sbuffer, outptr, blocksize)) {
                            printf("FAIL: SPcombine and PScombine decrypt different results\n");
#ifdef DEBUGTRACE
                            printf("PSplaintext: \t");
                            for (j = 0; j < blocksize; j++)
                                    printf("%2.2x ", outptr[j]);
                            printf("\n");
                            printf("SPplaintext: \t");
                            for (j = 0; j < blocksize; j++)
                                    printf("%2.2x ", sbuffer[j]);
                            printf("\n");
#endif
                    } else {
                            printf("PASS: SPcombine and PScombine decrypt same results\n");
                    }
            }
}
// housekeeping tasks when we are done
SPCipher::~SPCipher()
{
        if (sbuffer) delete sbuffer;
        if (tsbuffer) delete tsbuffer;
        if (tbuffer) delete tbuffer;
        if (tinvbuffer) delete tinvbuffer;
}
// setup to atomically decrypt/re-encrypt data. The old data was encrypted with oldkey, oldIV, and
// stream ciphers oldss and oldps. We will change it to be encrypted with newkey, newIV, and
// stream ciphers newss and newps.
SPKeyChanger::SPKeyChanger(StreamCipher *oldss, StreamCipher *oldps, Data oldkey, Data oldiv,
                StreamCipher *newss, StreamCipher *newps, Data newkey, Data newiv, int bs)
{
        blocksize = bs;
        olds = oldss;
        oldprng = oldps;
        news = newss;
        newprng = newps;
        // initialize the old first stream cipher
        olds->setup(oldkey, oldiv);
        // initialize the old second stream cipher used to generate permutations
        oldprng->setup(oldkey, oldiv);
        // initialize the new first stream cipher
        news->setup(newkey, newiv);
        // initialize the new second stream cipher used to generate permutations
        newprng->setup(newkey, newiv);
        // allocate some working storage
        sbuffer = new unsigned char [bs];
        tbuffer = new unsigned int [bs];
        tinvbuffer = new unsigned int [bs];
        oldsbuffer = new unsigned char [bs];
        oldtbuffer = new unsigned int [bs];
```

```
                newsbuffer = new unsigned char [bs];
                newtbuffer = new unsigned int [bs];
}
// atomically decrypt and re-encrypt "in" to output buffer "out"
// (The two buffers may NOT overlap).
SPKeyChanger::change(Data in, Data out)
{
        unsigned char *inptr, *outptr;
        int i, j;
        Data sdata;
        if (in.length != out.length)
                throw;
        sdata.length = blocksize;
        inptr = in.value;
        outptr = out.value;
        // do this for in.length (same as out.length) blocks
        for (i = 0; i < in.length; i++, inptr += blocksize, outptr += blocksize) {
                // generate a block of substitution stream S1 (old key)
                sdata.value = oldsbuffer;
                olds->generate(sdata);
                // generate a block of substitution stream S2 (new key)
                sdata.value = newsbuffer;
                news->generate(sdata);
                // generate permutation T1 (old key)
                genPermutation(oldprng, blocksize, oldtbuffer);
                // generate permutation T2 (new key)
                genPermutation(newprng, blocksize, newtbuffer);
                // compute permutation T1inv, inverse of permutation T1
                for (j = 0; j < blocksize; j++) {
                        tinvbuffer[oldtbuffer[j]] = j;
                }
                // compute the combined values for S and T
                for (j = 0; j < blocksize; j++) {
                        // combined T = T2(T1inv)
                        tbuffer[j] = newtbuffer[tinvbuffer[j]];
                        // combined S = T1(S1 xor S2)
                        sbuffer[oldtbuffer[j]] = oldsbuffer[j] ^ newsbuffer[j];
                }
                // apply the combined substitution and permutation to a block of data
                SPcombine(sbuffer, tbuffer, inptr, outptr, blocksize);
                // using the same trusted module output (T and S), we could use an PScombiner
                // with a little bit of work:  S' = T(S)
                for (j = 0; j < blocksize; j++) {
                        oldsbuffer[tbuffer[j]] = sbuffer[j];
                }
                PScombine(oldsbuffer, tbuffer, inptr, newsbuffer, blocksize);
                if (memcmp(newsbuffer, outptr, blocksize)) {
                        printf("FAIL: SPcombine and PScombine transcrypt different results\n");
#ifdef DEBUGTRACE
                        printf("SPciphertext: \t");
                        for (j = 0; j < blocksize; j++)
                                printf("%2.2x ", outptr[j]);
                        printf("\n");
                        printf("PSciphertext: \t");
                        for (j = 0; j < blocksize; j++)
                                printf("%2.2x ", newsbuffer[j]);
```

```
                                printf("\n");
#endif
                        } else {
                                printf("PASS: SPcombine and PScombine transcrypt same results\n");
                        }
                }
        }
}
// housekeeping cleanup
SPKeyChanger::~SPKeyChanger()
{
        if (sbuffer) delete sbuffer;
        if (tbuffer) delete tbuffer;
        if (tinvbuffer) delete tinvbuffer;
        if (oldsbuffer) delete oldsbuffer;
        if (oldtbuffer) delete oldtbuffer;
        if (newsbuffer) delete newsbuffer;
        if (newtbuffer) delete newtbuffer;
}
// the PS cipher is the twin of the SP cipher
// set up the PS cipher with a certain key and IV (publicly known key value)
// using two stream cipher implementations.
// bs is the blocksize (8192 in one embodiment)
// This implementation uses the byte as a transposition unit.
PSCipher::PSCipher(StreamCipher *ss, StreamCipher *ps, Data key, Data iv, int bs)
{
        blocksize = bs;
        s = ss;
        prng = ps;
        // initialize the stream cipher for substitution
        s->setup(key, iv);
        // initialize the stream cipher we use as a pseudo-random number generator
        prng->setup(key, iv);
        sbuffer = new unsigned char [bs];
        tsbuffer = new unsigned char [bs];
        tbuffer = new unsigned int [bs];
        tinvbuffer = new unsigned int [bs];
}
// encrypt one or more blocks of "in" data into output buffer "out"
// (The input and output buffers may NOT overlap).
PSCipher::encrypt(Data in, Data out)
{
        unsigned char *inptr, *outptr;
        int i, j;
        Data sdata = { blocksize, sbuffer};
        if (in.length != out.length)
                throw;
        inptr = in.value;
        outptr = out.value;
        // do this for in.length (same as out.length) blocks
        for (i = 0; i < in.length; i++, inptr += blocksize, outptr += blocksize) {
                // generate a block of substitution data using the first stream cipher
                // in the usual manner
                s->generate(sdata);
                // generate a pseudo-random permutation using the second stream cipher as a
                // pseudo-random number generator
                genPermutation(prng, blocksize, tbuffer);
```

```
            // apply the permutation and then substitution data to a block of data
            PScombine(sbuffer, tbuffer, inptr, outptr, blocksize);
            // alternatively, we could use SPcombine if we use S' = Tinv(S)
            for (j = 0; j < blocksize; j++) {
                    // compute the inverse permutation
                    tinvbuffer[tbuffer[j]] = j;
            }
            for (j = 0; j < blocksize; j++)
                    tsbuffer[tinvbuffer[j]] = sbuffer[j];
            SPcombine(tsbuffer, tbuffer, inptr, sbuffer, blocksize);
            if (memcmp(sbuffer, outptr, blocksize)) {
                    printf("FAIL: SPcombine and PScombine encrypt different results\n");
#ifdef DEBUGTRACE
                    printf("PSciphertext: \t");
                    for (j = 0; j < blocksize; j++)
                            printf("%2.2x ", outptr[j]);
                    printf("\n");
                    printf("SPciphertext: \t");
                    for (j = 0; j < blocksize; j++)
                            printf("%2.2x ", sbuffer[j]);
                    printf("\n");
#endif
            } else {
                    printf("PASS: SPcombine and PScombine encrypt same results\n");
            }
    }
}
// decrypt one or more blocks of "in" data into output buffer "out"
// (The input and output buffers may NOT overlap).
PSCipher::decrypt(Data in, Data out)
{
    unsigned char *inptr, *outptr;
    int i, j;
    Data sdata = { blocksize, sbuffer};
    if (in.length != out.length)
            throw;
    inptr = in.value;
    outptr = out.value;
    // do this for in.length (same as out.length) blocks
    for (i = 0; i < in.length; i++, inptr += blocksize, outptr += blocksize) {
            // generate a block of substitution data using the first stream cipher
            // in the usual manner--we'll transpose it later
            s->generate(sdata);
            // generate a pseudo-random permutation using the second stream cipher as a
            // pseudo-random number generator
            genPermutation(prng, blocksize, tbuffer);
            for (j = 0; j < blocksize; j++) {
                    // compute the inverse permutation for decryption
                    tinvbuffer[tbuffer[j]] = j;
            }
            // use the SPcombine to decrypt (substitute, then transpose)
            SPcombine(sbuffer, tinvbuffer, inptr, outptr, blocksize);
            // alternatively, transpose and then substitute using Tinverse and S' = Tinv(S)
            for (j = 0; j < blocksize; j++) {
                    // send the substitution data through the original permutation for
alternative
```

```
                    tsbuffer[tinvbuffer[j]] = sbuffer[j];
            }
            PScombine(tsbuffer, tinvbuffer, inptr, sbuffer, blocksize);
            if (memcmp(sbuffer, outptr, blocksize)) {
                    printf("FAIL: SPcombine and PScombine decrypt different results\n");
#ifdef DEBUGTRACE
                    printf("PSplaintext: \t");
                    for (j = 0; j < blocksize; j++)
                            printf("%2.2x ", outptr[j]);
                    printf("\n");
                    printf("SPplaintext: \t");
                    for (j = 0; j < blocksize; j++)
                            printf("%2.2x ", sbuffer[j]);
                    printf("\n");
#endif
            } else {
                    printf("PASS: SPcombine and PScombine decrypt same results\n");
            }
        }
}
// housekeeping tasks when we are done
PSCipher::~PSCipher()
{
        if (sbuffer) delete sbuffer;
        if (tsbuffer) delete tsbuffer;
        if (tbuffer) delete tbuffer;
        if (tinvbuffer) delete tinvbuffer;
}
// setup to atomically decrypt/re-encrypt data. The old data was encrypted with oldkey, oldIV, and
// stream ciphers oldss and oldps. We will change it to be encrypted with newkey, newIV, and
// stream ciphers newss and newps.
PSKeyChanger::PSKeyChanger(StreamCipher *oldss, StreamCipher *oldps, Data oldkey, Data oldiv,
                StreamCipher *newss, StreamCipher *newps, Data newkey, Data newiv, int bs)
{
        blocksize = bs;
        olds = oldss;
        oldprng = oldps;
        news = newss;
        newprng = newps;
        // initialize the old first stream cipher
        olds->setup(oldkey, oldiv);
        // initialize the old second stream cipher used to generate permutations
        oldprng->setup(oldkey, oldiv);
        // initialize the new first stream cipher
        news->setup(newkey, newiv);
        // initialize the new second stream cipher used to generate permutations
        newprng->setup(newkey, newiv);
        // allocate some working storage
        sbuffer = new unsigned char [bs];
        tbuffer = new unsigned int [bs];
        tinvbuffer = new unsigned int [bs];
        oldsbuffer = new unsigned char [bs];
        oldtbuffer = new unsigned int [bs];
        newsbuffer = new unsigned char [bs];
        newtbuffer = new unsigned int [bs];
```

```
}
// atomically decrypt and re-encrypt "in" to output buffer "out"
// (The two buffers may NOT overlap).
PSKeyChanger::change(Data in, Data out)
{
        unsigned char *inptr, *outptr;
        int i, j;
        Data sdata;
        if (in.length != out.length)
                throw;
        sdata.length = blocksize;
        inptr = in.value;
        outptr = out.value;
        // do this for in.length (same as out.length) blocks
        for (i = 0; i < in.length; i++, inptr += blocksize, outptr += blocksize) {
                // generate a block of substitution stream S1 (old key)
                sdata.value = oldsbuffer;
                olds->generate(sdata);
                // generate a block of substitution stream S2 (new key)
                sdata.value = newsbuffer;
                news->generate(sdata);
                // generate permutation T1 (old key)
                genPermutation(oldprng, blocksize, oldtbuffer);
                // generate permutation T2 (new key)
                genPermutation(newprng, blocksize, newtbuffer);
                // compute permutation T1inv, inverse of permutation T1
                for (j = 0; j < blocksize; j++) {
                        tinvbuffer[oldtbuffer[j]] = j;
                }
                // compute the combined values for S and T
                for (j = 0; j < blocksize; j++) {
                        // combined T = T2(T1inv)
                        tbuffer[j] = newtbuffer[tinvbuffer[j]];
                }
                for (j = 0; j < blocksize; j++) {
                        // combined S = T2(T1inv((S1)) xor S2, start with T2(T1inv((S1))
                        sbuffer[tbuffer[j]] = oldsbuffer[j];
                }
                for (j = 0; j < blocksize; j++) {
                        sbuffer[j] ^= newsbuffer[j]; // finish S = T2(T1inv(S1)) xor S2
                }
                // apply the combined substitution and permutation to a block of data
                PScombine(sbuffer, tbuffer, inptr, outptr, blocksize);
                // using the same trusted module output (T and S), we could use an SPcombiner
                // with a little bit of work: S' = Tinv(S)
                for (j = 0; j < blocksize; j++) {
                        tinvbuffer[tbuffer[j]] = j;
                }
                for (j = 0; j < blocksize; j++) {
                        oldsbuffer[tinvbuffer[j]] = sbuffer[j];
                }
                SPcombine(oldsbuffer, tbuffer, inptr, newsbuffer, blocksize);
                if (memcmp(newsbuffer, outptr, blocksize)) {
                        printf("FAIL: SPcombine and PScombine transcrypt different results\n");
#ifdef DEBUGTRACE
                        printf("PSciphertext: \t");
```

```
                        for (j = 0; j < blocksize; j++)
                                printf("%2.2x ", outptr[j]);
                        printf("\n");
                        printf("SPciphertext: \t");
                        for (j = 0; j < blocksize; j++)
                                printf("%2.2x ", newsbuffer[j]);
                        printf("\n");
#endif
                } else {
                        printf("PASS: SPcombine and PScombine transcrypt same results\n");
                }
        }
}
// housekeeping cleanup
PSKeyChanger::~PSKeyChanger()
{
        if (sbuffer) delete sbuffer;
        if (tbuffer) delete tbuffer;
        if (tinvbuffer) delete tinvbuffer;
        if (oldsbuffer) delete oldsbuffer;
        if (oldtbuffer) delete oldtbuffer;
        if (newsbuffer) delete newsbuffer;
        if (newtbuffer) delete newtbuffer;
}
```

The invention claimed is:

1. A method comprising:
   receiving encrypted streamed content encrypted with a first key;
   generating a first key stream of a first stream cipher based on the first key and a second key;
   generating a second key stream of a second stream cipher based on the first and second keys; and
   simultaneously decrypting and re-encrypting the encrypted streamed content using a combination of the first and second key streams to produce re-encrypted streamed content encrypted with the second key.

2. The method of claim 1, wherein the first key stream comprises a substitution key stream and the second key stream comprises a transposition key stream.

3. The method of claim 1, wherein the first key stream comprises a transposition key stream and the second key stream comprises a substitution key stream.

4. The method of claim 1, further comprising:
   communicating the re-encrypted streamed content to a sink device.

5. The method of claim 2, wherein simultaneously decrypting and re-encrypting the encrypted streamed content comprises exclusive OR-ing the encrypted streamed content with the substitution key stream to produce an intermediate stream.

6. The method of claim 5, wherein simultaneously decrypting and re-encrypting the encrypted streamed content further comprises shuffling the intermediate stream according to the transposition key stream to produce the re-encrypted streamed content.

7. The method of claim 1, further comprising receiving at least one of the first key and the second key over a secure authenticated channel.

8. The method of claim 7, wherein receiving a key over a secure authenticated channel comprises receiving the key from a sales server.

9. The method of claim 4, further comprising communicating the second key to the sink device to enable the sink device to decrypt the re-encrypted streamed content.

10. The method of claim 1, wherein the encrypted streamed content is publicly available and encrypted with a public key and wherein the first key is a locally available private key.

11. The method of claim 1, wherein the encrypted streamed content is a broadcast entertainment program received over a broadcast channel.

12. The method of claim 1, wherein generating the first and second key streams, and simultaneous decrypting and re-encrypting using a combination of the first and second key streams, are performed within a trusted module.

13. An article comprising: a machine-accessible medium having stored thereon data representing sequences of instructions which, when executed by a machine, cause the machine to perform the operations of
   receiving encrypted streamed content encrypted with a first key;
   generating a first key stream of a first stream cipher based on the first key and a second key;
   generating a second key stream of a second stream cipher based on the first and second keys; and
   simultaneously decrypting and re-encrypting the encrypted streamed content using a combination of the first and second key streams to produce re-encrypted streamed content encrypted with the second key.

14. The article of claim 13, wherein the first key stream comprises a substitution key stream and the second key stream comprises a transposition key stream.

15. The article of claim 13, wherein the first key stream comprises a transposition key stream and the second key stream comprises a substitution key stream.

16. The article of claim 13, further comprising instructions for communicating the re-encrypted streamed content to a sink device.

17. The article of claim 14, wherein instructions for simultaneously decrypting and re-encrypting the encrypted streamed content comprises instructions for exclusive OR-ing the encrypted streamed content with the substitution key stream to produce an intermediate stream.

18. The article of claim 17, wherein simultaneously decrypting and re-encrypting the encrypted streamed content further comprises shuffling the intermediate stream according to the transposition key stream to produce the re-encrypted streamed content.

19. The article of claim 13, further comprising instructions for receiving at least one of the first key and the second key over a secure authenticated channel.

20. An apparatus comprising:
   a content interface to receive encrypted streamed content encrypted with a first key;
   a computing device to generate a first key stream of a first stream cipher based on the first key and a second key, to generate a second key stream of a second stream cipher based on the first and second keys, and to simultaneously decrypt and re-encrypt the encrypted streamed content using a combination of the first and second key streams to produce re-encrypted streamed content encrypted with the second key; and
   a sink device interface to communicate the re-encrypted streamed content to a sink device.

21. The apparatus of claim 20, wherein the first key stream comprises a substitution key stream and the second key stream comprises a transposition key stream.

22. The apparatus of claim 20, wherein the first key stream comprises a transposition key stream and the second key stream comprises a substitution key stream.

23. The apparatus of claim 20, further comprising a secure authenticated channel interface to receive at least one of the first key and the second key.

24. The apparatus of claim 21, wherein the computing device generates the substitution key stream using a stream cipher.

25. The apparatus of claim 20, wherein the computing device communicates the second key to the sink device to enable the sink device to decrypt the re-encrypted streamed content.

26. The apparatus of claim 20, wherein the computing device includes a broadcast entertainment set-top box.

27. The apparatus of claim 21, wherein the computing device comprises an exclusive-OR module to exclusive OR the encrypted streamed content with the substitution key stream to produce an intermediate stream.

28. The apparatus of claim 27, wherein the computing device comprises a shuffler module to shuffle the intermediate stream according to the transposition key stream to produce the re-encrypted streamed content.

29. The apparatus of claim 20, wherein the computing device comprises a trusted module to generate the key streams and to simultaneously decrypt and re-encrypt the encrypted streamed content.

30. A system comprising:
- a sales server to send a first key and a second key over at least one secure authenticated channel;
- an authoring module to encrypt content into encrypted content using the first key and to send the encrypted content; and
- a receiving device to receive the first key from the sales server, to receive the encrypted content from the authoring module, to generate a first key stream of a first stream cipher based on the first key and the second key, to generate a second key stream of a second stream cipher based on the first and second keys, and to simultaneously decrypt and re-encrypt the encrypted content using a combination of the first and second key streams to produce re-encrypted content encrypted with the second key.

31. The system of claim 30, further comprising a sink device coupled to the sales server and the receiving device to receive the second key from the sales server over a secure authenticated channel, to receive the re-encrypted content from the receiving device, to decrypt the re-encrypted content using the second key, and to render the content for perception by a user.

32. The system of claim 30, wherein the encrypted content is broadcast by the authoring module to the receiving device using a broadcast medium.

33. The system of claim 30, wherein the receiving device comprises a trusted module to receive the first key from the sales server, to generate the first key stream based on the first key and a second key, and to generate the second key stream based on the first and second keys.

34. The system of claim 33, wherein the receiving device comprises an exclusive-OR module to exclusive OR the encrypted content with the first key stream to produce an intermediate stream.

35. The system of claim 34, wherein the receiving device comprises a shuffler module to shuffle the intermediate stream according to the second key stream to produce the re-encrypted content.

36. The system of claim 30, wherein the receiving device comprises a trusted module to simultaneously decrypt and re-encrypt the encrypted content.

* * * * *